Figure 1:
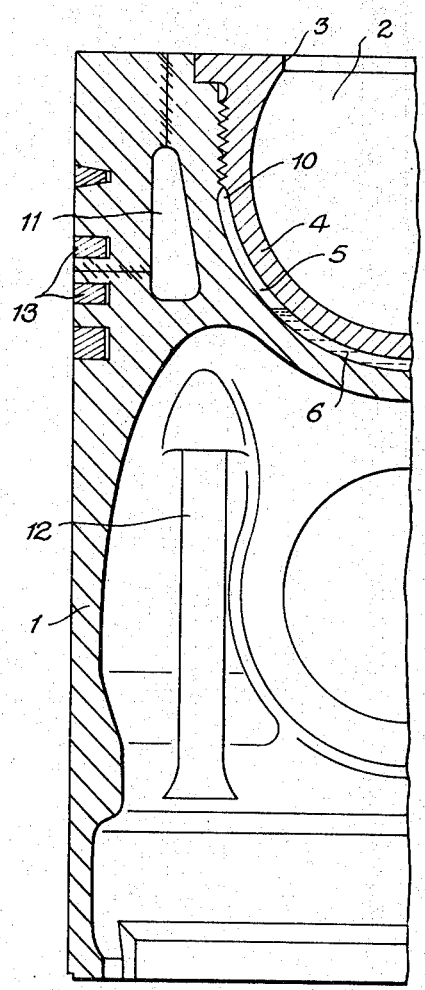

United States Patent

[11] 3,545,341

[72] Inventor: Hans Fischer, Nurnberg, Germany
[21] Appl. No.: 744,017
[22] Filed: July 11, 1968
[45] Patented: Dec. 8, 1970
[73] Assignee: Maschinenfabrik Augsburg-Nurnberg Aktiengesellschaft, Nurnberg, Germany
[32] Priority: July 15, 1967
[33] Germany
[31] No. 1,576,733

[54] INTERNAL COMBUSTION ENGINE PISTON COOLING
1 Claim, 2 Drawing Figs.

[52] U.S. Cl. .............................................. 92/176, 92/186; 123/41.16, 123/41.35
[51] Int. Cl. .................................................... F01b 31/08
[50] Field of Search ........................................... 92/176, 186; 123/41.35, 41.16

[56] References Cited
UNITED STATES PATENTS

| | | | |
|---|---|---|---|
| 1,373,263 | 3/1921 | Regenbogen | 92/176 |
| 1,876,917 | 9/1932 | Gosslau | 123/41.16 |
| 2,104,347 | 1/1938 | Larkin | 92/176 |
| 2,153,501 | 4/1939 | Harper, Jr. | 123/41.16 |
| 2,214,891 | 9/1940 | Schrom | 92/176X |
| 2,840,427 | 6/1958 | Dolza | 92/176 |
| 3,066,002 | 11/1962 | Rudkin, Jr. | 92/176 |
| 3,204,617 | 9/1965 | Hulbert | 92/186X |
| 3,221,722 | 12/1965 | Bachle | 123/41.35 |

FOREIGN PATENTS

| | | | |
|---|---|---|---|
| 288,136 | 9/1928 | Great Britain | 123/41.16 |

Primary Examiner—Martin P. Schwadron
Assistant Examiner—Irwin C. Cohen
Attorney—Stephens, Huettig & O'Connell ABSTRACT: An internal combustion engine piston has an inner cooling space partially filled with a coolant having a melting point from about 180° to 250°C, and a separate outer cooling space in which the coolant is lubricating oil. This facilitates cold starting.

PATENTED DEC 8 1970

3,545,341

INVENTOR

Hans Fischer

BY Stephens, Huettig and O'Connell
ATTORNEYS

INTERNAL COMBUSTION ENGINE PISTON COOLING

This invention relates to a method of cooling an internal combustion engine piston having a combustion chamber and inner and outer cooling spaces.

Known methods of cooling I.C. engine pistons provide for control of the temperature of the piston or parts thereof that are especially exposed to hot combustion gases by spraying cooling oil into the interior of the underside of the piston, or by force-feeding cooling oil through the crank shaft, through the connecting rod and the piston pin into the cooling space of an integral or built-up piston, or by spraying cooling oil by nozzles connected to a separate cooling oil circuit into the cooling space in the piston for cooling by the circulating cooling oil.

In pistons of I.C. engines having a spherical or cup-shaped combustion chamber in the piston crown such cooling methods fail to ensure that the heat dissipation from the combustion chamber wall of the piston during starting, especially at low temperatures, during no-load and at low part loads, is so little that a sufficiently high temperature is quickly reached on the combustion chamber inner surface to cause satisfactory combustion of fuel reaching the wall accidentally or intentionally, and while maintaining at the same time an adequately low temperature level on the outer surface of the piston facing the cylinder wall in which the piston rings are located to afford satisfactory lubrication of the cylinder inner surface and prevent gumming of the lubricating oil and sticking of the piston rings in the grooves.

It is the object of this invention to provide control of the temperature ranges in the wall of the combustion chamber in the piston and, thereby, in the combustion chamber space in an I.C. engine to suit the various load conditions of the engine.

In general, these objects are obtained by inherent control of the temperature of the combustion chamber wall dependent on the intake air temperature and engine loading and the provision of two completely separate cooling spaces.

In other words, the novel feature of this invention is the provision of two cooling zones which are independent of each other, one cooling zone controlling the temperature of the combustion chamber wall and the other cooling zone controlling the temperature of the other components of the piston, for example, the upper part of the piston where the piston rings are located, with the temperature of the combustion chamber wall being varied automatically.

Regarding the self-regulating temperature control of the combustion chamber wall, another feature of this invention provides for the use of two different types of coolant, namely a high-conductive material having a preset melting point to partially fill the inner cooling space, and engine lubricating oil as is conventional practice in the outer cooling space. The coolant in the inner cooling space according to this invention is metal, the reason being that this is normally initially solid and contacts only a relatively small proportion of the combustion chamber wall as long as it is cold so that a negligible cooling effect is produced under these conditions. Any other coolant that remains liquid at ambient temperatures under which the engine is operated would continue to provide intensive cooling by the cocktail shaker effect even under conditions where this is completely undesirable. A suitable coolant for this invention is, for example, Woods metal, an alloy consisting of bismuth, lead and tin which liquifies at a temperature from about 180° to 250° C. and the action of which is described hereinafter. However, as an alternative to Woods metal, it is possible to use any salt, such as sodium, that liquifies at the said temperatures.

Figure 2:
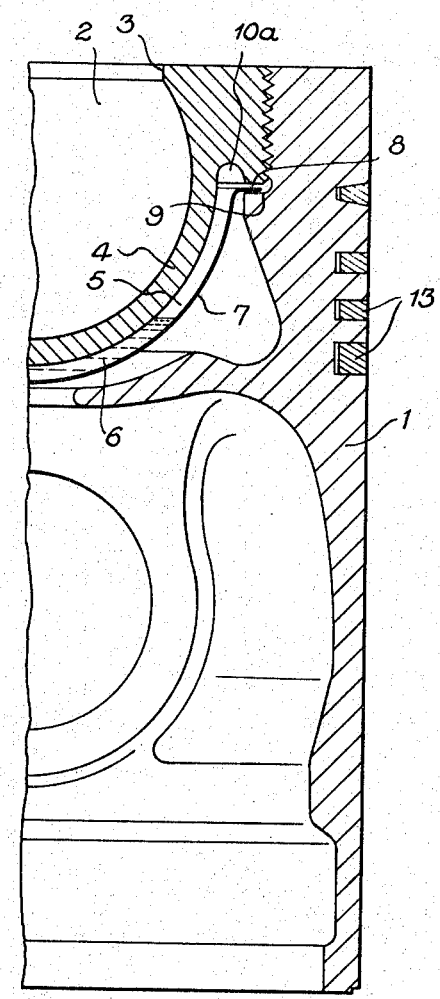

The means by which the objects of this invention are obtained are described more fully with reference to the accompanying drawings, in which:

FIG. 1 is a cross-sectional view through one-half of the piston of this invention; and FIG. 2 is a similar view of a modified form of FIG. 1.

As shown in FIG. 1, the I.C. engine piston 1 has a combustion chamber 2, spherical in this case, in its crown with a constricted throat 3. The combustion chamber is formed by a separate insert in the piston crown. The combustion chamber wall 4 is partly surrounded by an inner cooling space 5 which is formed integral with the piston body. The inner cooling space 5 is partly filled with a material 6 having a preselected melting point which is roughly between 180° and 250° C.

In the modification shown in FIG. 2, the same components of the piston are marked with the same numerals as in FIG. 1. Physically, the inner annular space 5 surrounding the combustion chamber wall 4 is confined by a cup 7 placed in the upper part of the piston. This cup has a flange 8 around its opening which, as the combustion chamber 2 is screwed into the piston crown, is firmly pressed onto an annular shoulder 9.

Self-regulating action in both versions is in the same manner, functioning as follows: As long as the combustion wall temperature is, say, below 180° C., the heat-conductive material 6 is still solid and will remain in the position shown, unaffected by the movement of the piston in the running engine. During this phase, the dead air space in the inner cooling space not filled liquifies the material 6 forms an efficient heat barrier, while heat is dissipated from the combustion chamber wall 4 only from those surface areas which are covered by the still solid material 6. As a result, when the engine is started, the combustion chamber wall is quickly heated by the combustion gases in the combustion chamber in the desired manner. As soon, however, as the combustion chamber wall temperature rises to, say, 200° C., the material 6 liquifies and is vigorously thrown up and down by the reciprocating piston motion, which is described as the cocktail-shaker effect. Whenever the piston descends, the now liquid material 6 is thrown up to the upper end 10, FIG. 1, or end 10a, FIG. 2, so that heat dissipation takes place also from the upper part of the combustion chamber outer surface and, in this manner, the temperature of the whole combustion chamber outer surface is maintained uniformly at the favorable level for efficient combustion.

When the engine is shut down, the still liquid coolant will accumulate at the bottom of the inner cooling space and solidify when the temperature has decreased below, say, 180° C.

The outer annular space 11 in the upper part of the piston is supplied in a manner known in the art with engine lubricating oil for cooling which is introduced through a nozzle 12.

In stating the temperature range for the melting point of the heat conducting material 6, customary combustion chamber wall temperatures have been taken as a basis. Should for any reason, a combustion system be employed where higher combustion chamber wall temperatures are permissible, or necessary, then a material with a different melting range would be placed into the inner annular space.

The advantages of this invention are in the fact that this method enables, firstly, that during cold starts, at no load and at fractional loads the highest possible temperature is quickly reached on the inner surface of the combustion chamber without the outer surface of the piston with the piston rings 13 which slide in the engine cylinder being heated to an extent that satisfactory cooling and lubrication of the piston working surface is prevented and, secondly, under conditions of increasing load and full load of the engine, enough heat is removed from the combustion chamber wall to prevent the permissible maximum temperature at the inner surface of the combustion chamber being exceeded. Control of this temperature prevents cracking of fuel impinging on the combustion chamber wall accidentally or deliberately which would cause an undesirable increased in combustion noise and deterioration of exhaust cleanliness by increased exhaust smoke. At the same time, adequate cooling and lubrication is ensured on the piston outside surface.

The method according to this invention prevents a gradual deterioration of the lubricating oil by excessive heating on the combustion chamber outer surface as is the case where heat removal from the hot piston parts is effected directly by the lubricating oil.

I claim:

1. An internal combustion engine piston comprising a piston body including a piston ring zone, a combustion chamber in said body defined by a combustion chamber wall, an inner cooling space defined in said body and surrounding said combustion chamber wall, normally solid heat conducting material means in said inner cooling space in partial contact with said combustion chamber wall as a solid and changing from a solid to a liquid when the combustion chamber reaches a preselected temperature and then intensively shaken to remove heat from said combustion chamber, an outer cooling space defined in said body and positioned between said inner cooling space and said ring zone, and liquid coolant means in said outer cooling space for removing heat therefrom to prevent transfer of heat from said inner cooling space to said ring zone.